Oct. 29, 1963    G. ALLIMANN    3,108,788
DRILLING MACHINE FOR CUTTING NON-CIRCULAR GALLERY
Filed Jan. 13, 1961    6 Sheets-Sheet 1

INVENTOR
Georges Allimann
BY
ATTORNEY

Oct. 29, 1963    G. ALLIMANN    3,108,788
DRILLING MACHINE FOR CUTTING NON-CIRCULAR GALLERY
Filed Jan. 13, 1961    6 Sheets-Sheet 2

INVENTOR.
Georges Allimann
BY
Karl W. Flocks
ATTORNEY

Oct. 29, 1963   G. ALLIMANN   3,108,788
DRILLING MACHINE FOR CUTTING NON-CIRCULAR GALLERY
Filed Jan. 13, 1961   6 Sheets-Sheet 3
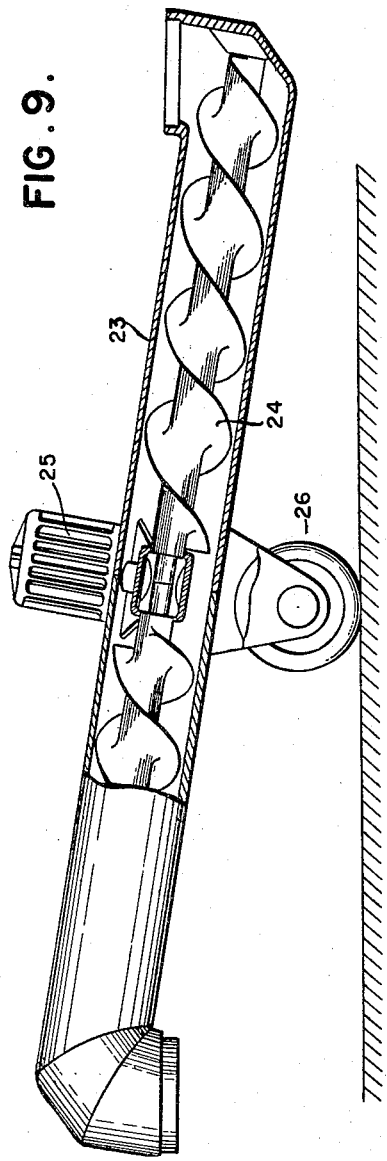
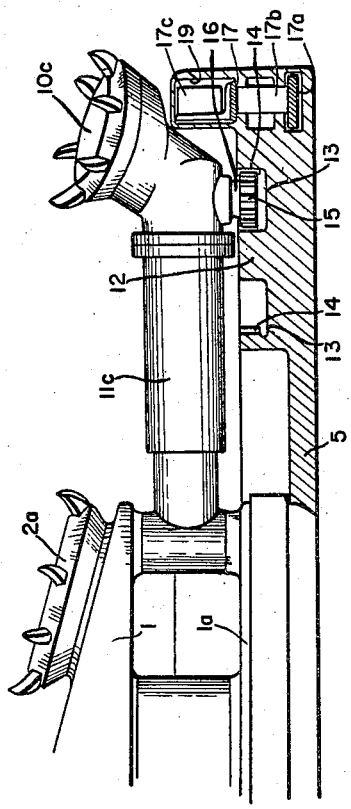
INVENTOR.
Georges Allimann
BY
Karl W. Flocks
ATTORNEY

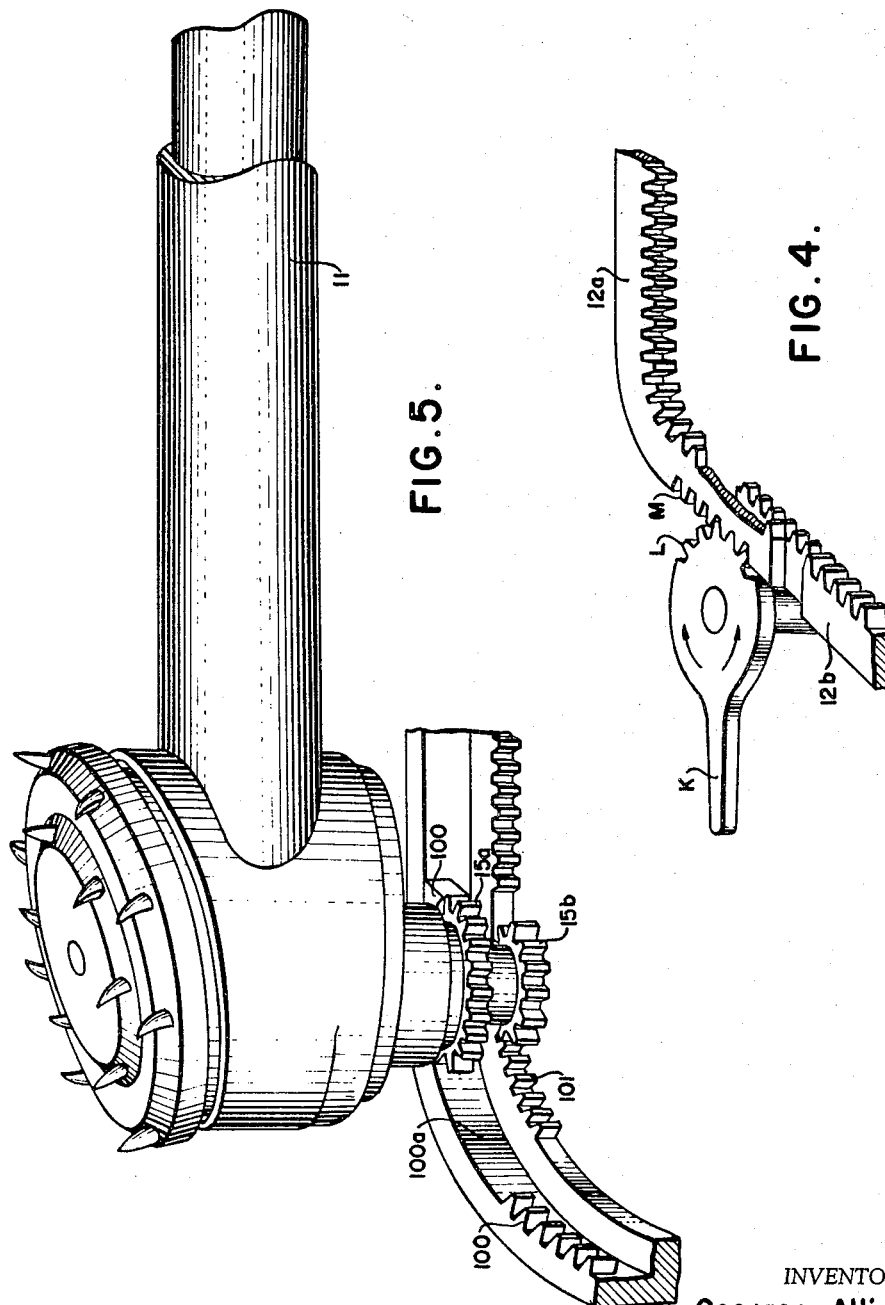

INVENTOR.
Georges Allimann
BY
*Karl W. Flocks*
ATTORNEY

Oct. 29, 1963  G. ALLIMANN  3,108,788
DRILLING MACHINE FOR CUTTING NON-CIRCULAR GALLERY
Filed Jan. 13, 1961  6 Sheets-Sheet 6

INVENTOR.
Georges Allimann
BY
Karl W. Flocks
ATTORNEY

United States Patent Office 3,108,788
Patented Oct. 29, 1963

3,108,788
DRILLING MACHINE FOR CUTTING
NON-CIRCULAR GALLERY
Georges Allimann, Mulhouse, France, assignor to Ateliers de Carspach, Carspach (Haut-Rhin), France, a French company
Filed Jan. 13, 1961, Ser. No. 82,460
Claims priority, application France July 2, 1955
12 Claims. (Cl. 262—7)

The present invention relates to a drilling machine for mines, quarries or the like, and more particularly to such a drilling machine in which one or more wandering drilling plates having inclined picks is caused to rotate on an internal axis and also to move over the face of a gallery to be cut.

The present application is a continuation-in-part of my copending application Serial No. 594,821, filed June 29, 1956, for "Drilling-Head for the Sinking of Shafts, Galleries and the Like," now Patent No. 2,976,027, issued on March 21, 1961.

In the above mentioned parent patent there is disclosed a machine having a rotary head that carries a plurality of rotary drilling plates. The drilling plates have picks extending from them which are inclined to the direction of rotation of the plates. The plates are at an angle to a plane perpendicular to the longitudinal axis of the machine, and their axes are inclined relative to any plane which comprises this longitudinal axis. The plates are rotated about the axis of the head, and on their own axes in the opposite direction.

In accordance with the present construction, there are additionally provided rotary drilling plates which are carried on extensible arms attached to the rotary head, so that as the rotary head rotates and the arms and drilling plates are carried with it, the distance of the drilling plates from the center of rotation of the rotary head may vary. The arms are pivotally secured to the head in the illustrative embodiment. The drilling plates are thereby moved in a pattern which may be other than circular, so that the drilling or cutting of a generally rectangular gallery may be effected.

The construction, operation and attendant advantages of the machine of the present invention will be understood from the following specification and drawings, wherein:

FIG. 3 shows the arrangement for the displacement of the wandering plates at the end of the arms thereof.

FIG. 4 is a perspective view, with parts removed, of an extensible template.

FIG. 5 is a perspective view of an arrangement of two superposed racks, enabling a wandering plate to be displaced at different speeds.

FIG. 9 is a partly sectional view of one element of the evacuation device.

Figure 1:
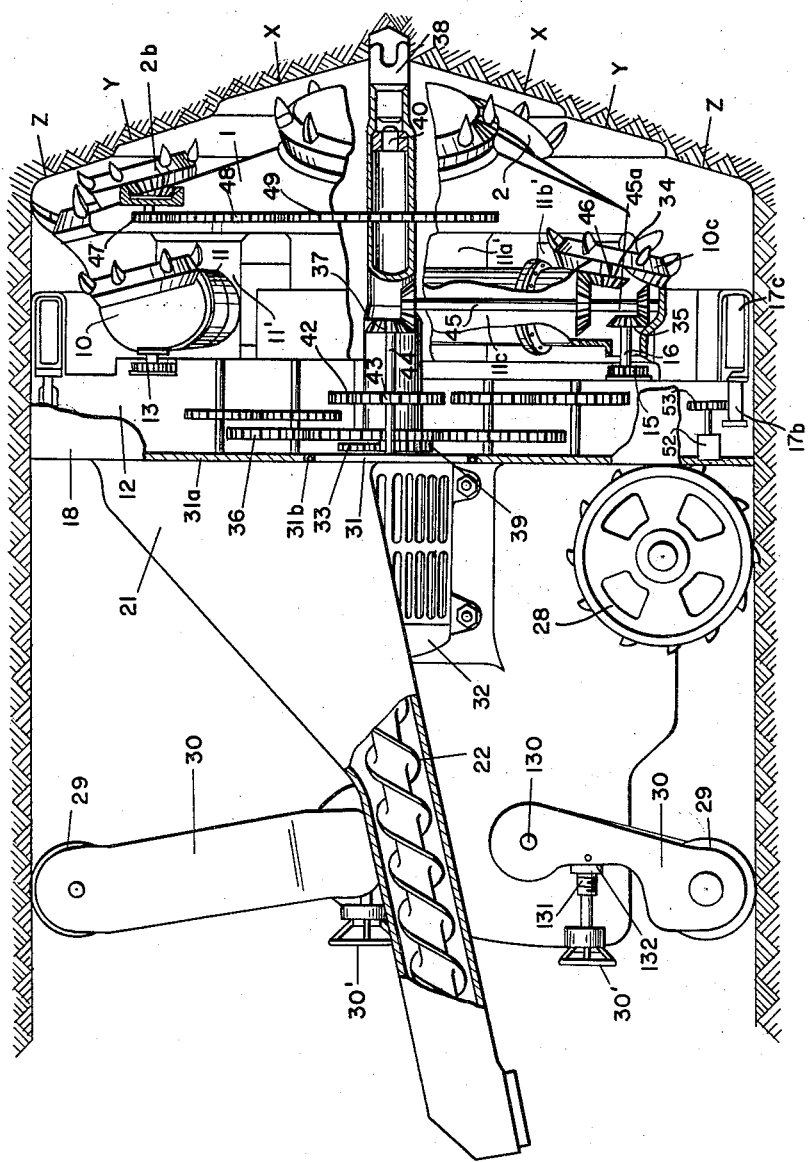
FIG. 1 is a side elevational view, with parts in section, of a machine in accordance with the invention.
Figure 2:
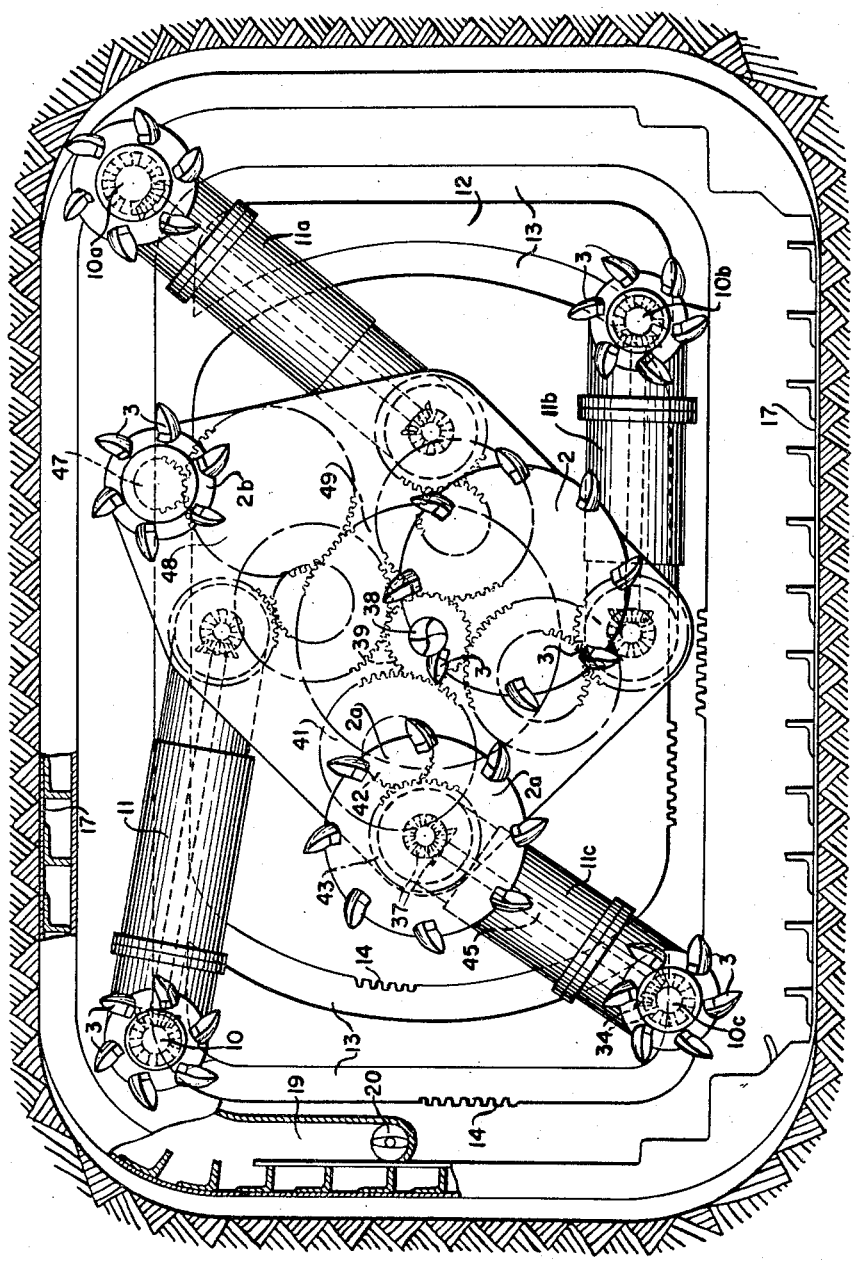
FIG. 2 is a front view, with parts in section, of the machine shown in FIG. 1.

Referring now to the drawings, and particularly to FIG. 2, it may be seen that the machine of the present invention is provided with a rotatable center head 1 having journaled thereon three plates, 2, 2a and 2b with their tools or picks 3. The tools or picks 3 strike in turn into the wall of rock or other materials and are then immediately withdrawn, and this action is the same as that of a hand pick. The three plates 2, 2a and 2b operate in different zones, in such manner that the rock is drilled out in steps X, Y, and Z, as is indicated in FIG. 1. This method of working facilitates the splitting of the rock which has already been cut away on one side of the step by the plate which has gone before. There is thus obtained a larger granular size of the pieces of rock drilled out of the wall being excavated, which represents a large economy of energy and reduced wear on the tools. In view of the short period of contact between the tools and the material to be removed, these tools do not become hot.

The diameter of the tool-carrier plates may be chosen quite freely. With a view to obtaining a better attack on the working face, a better efficiency and a better removal of the products resulting from the drilling, the diameter of any given plate, and in consequence of the points of the picks, may be chosen much larger than the width of the strip of the step to be excavated. In this case, there is always one part only of the plate which is located in front of the strip of the step, the plate being inclined in both directions with respect to the axis of the machine and being given a rotating movement about its own axis and a generally circular movement over a diameter more or less approximating to the mean diameter of the step being drilled.

The drilling head is provided with wandering tool-carrying wheels or plates 10, 10a, 10b, 10c arranged at the outer ends of arms 11, 11a, 11b, 11c which are articulated as permitted by their connection at their inner ends to rotatably mounted drum elements 11', 11a', 11b', 11c'; the arms are also adapted to slide in a telescoping manner. The drum elements 11', 11a', 11b' and 11c' are rotatably carried by the center head 1 and a plate 1a fixed to center head 1 and spaced rearwardly thereof, as shown in FIG. 3. These wandering plates enable right-angles or curvilinear sections to be given to the cavity to be drilled.

The wandering plates 10, 10a, 10b, 10c follow the perimeter of the section chosen. One or a number of templates 12, corresponding to this perimeter, are carried by a support plate 5 and serve to ensure the displacement of these plates on the extremities of the sliding articulated arms 11, 11a, 11b, 11c (see FIG. 2) and guide them. More exactly, the wandering plates 10 to 10c follow the outline of the sliders 13 formed in a template 12. One of the edges of these sliders is, for example, cut in the form of a toothed rack 14 and a corresponding gear 15, keyed on the shaft 16, of each wandering plate ensures the forward movement and the to-and-fro movement by engaging with this toothed rack 14 (see FIG. 3). The wandering plates 10 to 10c are thus given a rotating movement about their own axis, a separate advancing and to-and-fro movement, together with a general closed path movement about the axis of center head 1. The driving device, using gears as shown, may be replaced by equivalents known to the art. The movements of the wandering plates 10 to 10c with their tools which work to some extent eccentrically, are combined in order that the speed and the working effort may be balanced. There may be an advantage in causing the wandering plates 10 to 10c to move in certain cases at different speeds. For example, at an elbow connecting two straight lines, a reduction in the speed of advance may be desirable, whilst in other cases, on the contrary, the general movement of a moving plate may have to be accelerated (for example, when passing into portions which have already been excavated by preceding tools). To this end, there are provided two toothed racks 100 and 101 (FIG. 5) having their toothed portions in parallel superposed and offset relationship. Two corresponding gears 15 and 15b are keyed on the axis of the wandering plate under consideration. These gears are of different diameter and come alternatively into engagement with the toothed rack with which they cooperate. To an interrupted portion of a toothed rack, portion 100a of a rack 100, for instance, there corresponds an effective portion 101 of the other toothed rack, so that first one of the gears 15b and then the other gear 15a is in engagement with the rack with which it cooperates. It will be understood that in this manner, by reason of the different diameters of the gears, the moving plate moves more or less quickly depending on which gear is in engagement. This same movement may also be obtained by means of equivalents known to the art.

With the object of changing the dimensions in height and in width, and even the shape of the cavity during the operations, the template 12 may be made so that its guide structure is changeable, which enables the wandering plates to follow a different path and thereby gives a different shape or different dimensions to the cavity being drilled. In FIG. 4 there is shown an extensible template 12. By means of a lever K having a toothed sector L meshing with a rack M, a slidable portion 12a of the template 12 can be moved with respect to a fixed portion 12b thereof.

Figure 1A:
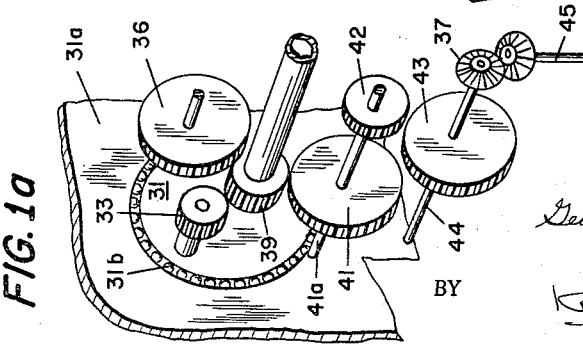
FIG. 1a is an exploded detail view in perspective of a portion of the drive gearing.

Rotation of the wandering plates 10, 10a, 10b and 10c on their own axes is obtained as follows:

A motor 32 has a shaft which extends through the plate 31 and has on its end a pinion 33 which is in mesh with the externally geared sleeve 39 (see FIGS. 1 and 1a). Sleeve 39 is journaled on a fixed center shaft 40. As may be seen in FIG. 2, four gears are in mesh with externally geared sleeve 39, each of which is an element in four substantially identical gear trains which drive the four wandering plates 10, 10a, 10b, 10c. For instance, as regards wandering plate 10c, the transmission of movement is obtained (see FIG. 1a) by means of gear 41 fixed on shaft 41a, which is driven by externally geared sleeve 39. Also on shaft 41a is a gear 42 which is in mesh with gear 43 keyed to the shaft 44 of a cone coupling 37, the other shaft 45 of which is located within arm 11c. Shaft 45 drives another cone coupling 34, on the other shaft 46 of which is mounted the moving plate 10c. Shaft 45 is necessarily extensible, and so is preferably of plural parts which are spline-connected.

Shaft 45 also constitutes, by means of an extension 45a, one of the shafts of another cone coupling 35, which by means of its other shaft 16 transmits motion to the gear 15 which moves on the toothed rack 14 (FIGS. 1 and 2).

Referring again to FIG. 1a, there is shown a second gear 36 which, as may be seen from FIG. 2, is part of the gear train for wandering plate 10. Other gears in the gear train to wandering plate 10, and the gears for wandering plates 10a and 10b are omitted from FIG. 1a for the sake of clarity. There are, as shown, two shafts for each of the four gear trains which are parallel to the axis of center shaft 40; these shafts, such as shafts 41a and 44, are journaled in a rotary plate 31a which is supported for rotary movement by the ball bearings 31b. Thus, these shafts therefore rotate on their own axes, and orbit about the axis of center shaft 40 with the drum elements 11, 11a', 11b' and 11c'.

The motion of motor 32 is also transmitted to each plate 2, 2a, 2b. For instance, as regards plate 2b, the transmission of motion is obtained by means of a series of gears 49, 48, 47 in mesh. Gear 49 is on sleeve 39, and rotates therewith. Head 1 is caused to rotate by the motor 32 through sleeve 39. The head is caused to rotate by forces applied to it from the articulated arms 11, 11a, 11b and 11c. The arms act against suitable stop elements (not shown) on the head 1.

Sleeve 39 which carries a gear at its rear end and is caused to rotate as hereinabove described, has a drill 38 fixed in the front thereof as shown in FIG. 1; thus, drill 38 rotates with sleeve 39.

The collection of the excavated material or muck is effected by means of a scraper conveyor comprising a pair of peripheral bands 17 and 17a (see FIG. 3) connected by a pin 17b, these parts thereby forming a chain. Secured to the band 17 are a series of scrapers 17c. The scraper conveyor is arranged behind the tool-carrying plates and against a screen 18 of the machine, as is shown in FIGS. 1 and 2. The scraper conveyor is driven by the motor 52 driving a sprocket 53 which engages the pins 17b. Motor 52 is suitably mounted on any stationary part of the machine 1 adjacent the scraper conveyor. As soon as it is broken away, the excavated material is received in the pockets between adjacent scrapers 17c of the scraper conveyor and is mainly discharged downwards behind the hole which is being drilled and thus directly on to the chain or the removal conveyor.

Figure 7:
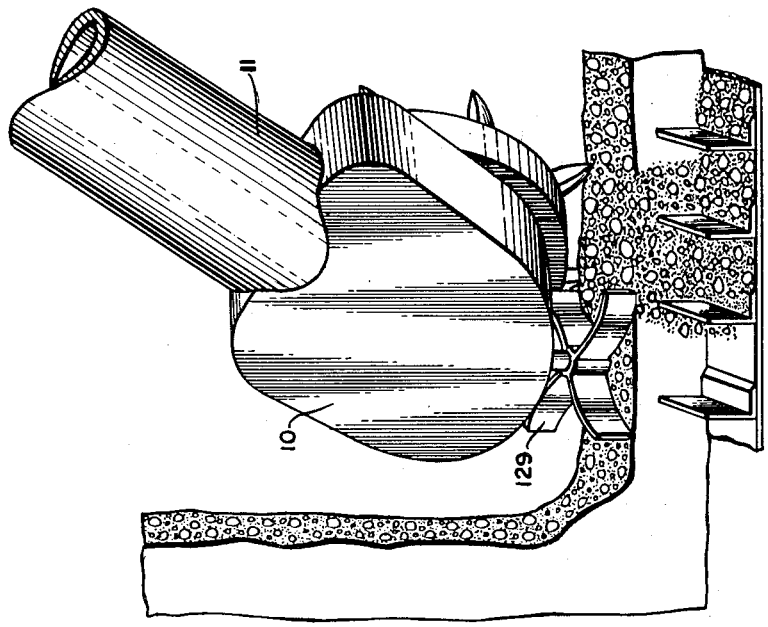
FIGS. 6 and 7 are perspective views of fittings mounted on the wandering plates.
Figure 6:
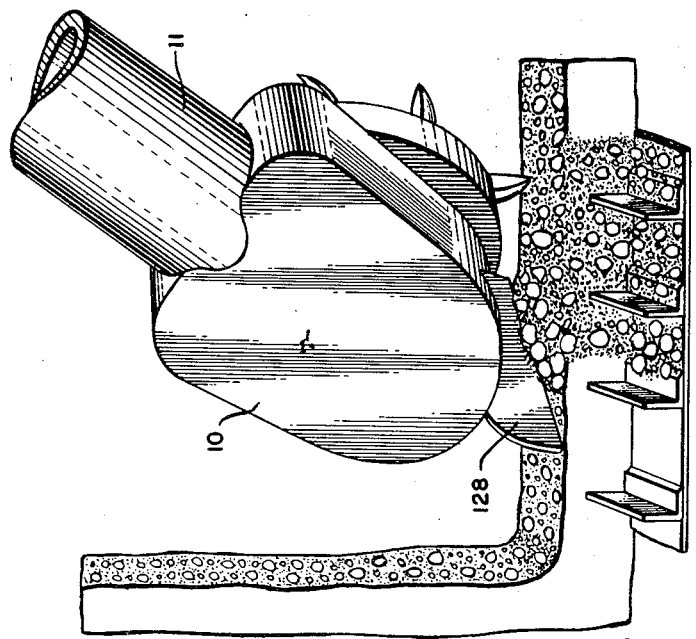

Scoops or scapers 128 and turbines or rotary blades 129 (FIGS. 6 and 7) are mounted on the wandering plates or on separate arms similar to the arms 11, 11a, 11b, 11c. The rotary blades 129 may be driven by suitable gearing from the shaft in an arm 11, 11a, 11b, 11c, such as the gear 35 on shaft 45a as shown in FIG. 1. These accessory devices complete the work of loading the conveyor chain 17 by discharging on to it, at each passage, the material which has fallen or been discharged to the side.

Figure 8:
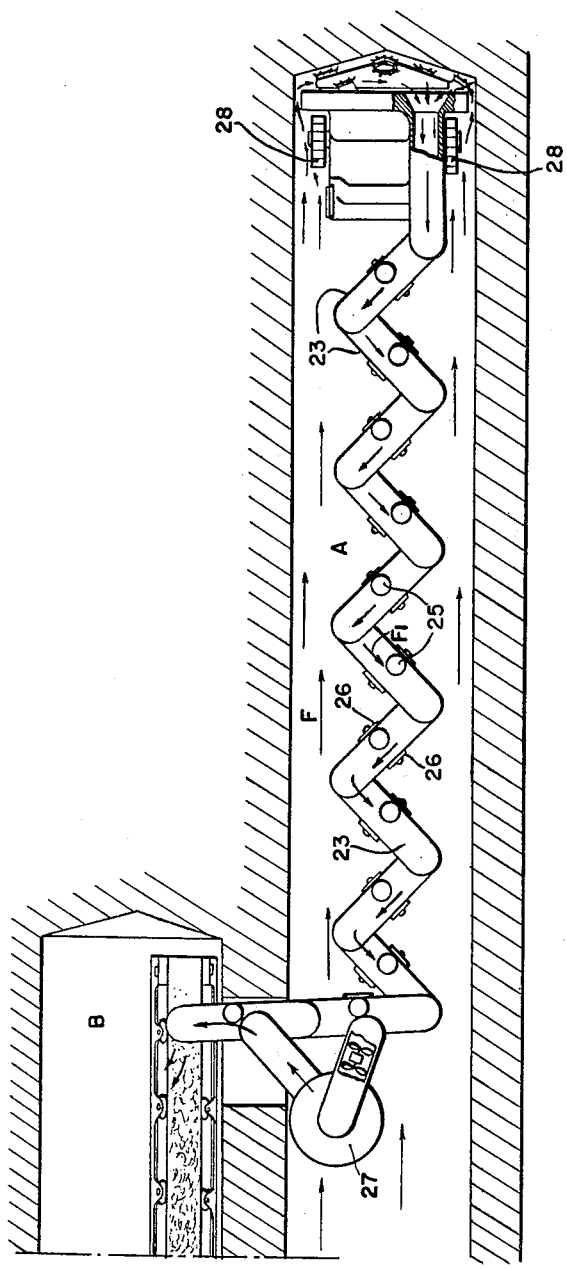
FIG. 8 shows diagrammatically the drilling machine and its evacuation device in a gallery.

The scraper chain or conveyor 17 constitutes an elevator by passing into a receiving casing 19 arranged on the side and forming a spill-way 20 at its upper part. This arrangement enables the excavated material to be dropped by successive scrapers of conveyor 17 into the receiving casing 19 (see the upper left hand part of FIG. 2) and to be removed to the rear of the machine into a chute 21, which may be provided, if necessary, with an Archimedean screw 22 (see FIG. 1). From this chute or hopper the excavated material follows the path formed by a plurality of tubular elements 23 having internal Archimedean screws 24 (see FIGS. 8 and 9) coupled to each other in the same way as a folding rule, by means of rotatable fittings. Each tubular element forms, in principle, a separate unit, and includes its own motor 25 which drives the Archimedean screw 24 at its center. The unit is mounted on orientable wheels 26. This series of tubular elements or units, coupled by articulation to each other, enables the whole assembly to be extended so as to follow the machine, whilst the excavated material is discharged at a fixed point located towards the rear. The discharge may be here in the same gallery or in a parallel gallery, as will be understood.

A dust extraction fan 27 is connected to a tubular element 23 near the end of the series of such elements which is remote from the drilling machine, in order to remove dust from the front of the machine and to ventilate the gallery A. A current of air F is created in the gallery A and passes in front of the working face; it becomes laden with dust, and enters into the chute 21 and the tubular elements 23. The dust-laden air is drawn into the dust-extraction fan 27, and is then forced by fan 27 into the gallery B, as indicated by the arrows, fan 27 thereby functioning as a suction ventilator.

The excavating machine in accordance with the invention is carried by two wheels 28 or endless motor-driven tracks (see FIGS. 1 and 2). It can be orientated in any direction by means of guiding rollers 29. These rollers are mounted on the extremity of pivotally-mounted arms 30 which may be extended and which can be operated from the rear by means of hand-wheels 31, either directly or through the medium of a hydraulic drive. Each arm 30 can, in accordance with one embodiment, be pivoted about a spindle 130. This pivoting is controlled by means of a hand wheel 31 secured at the end of a jack rod 131, which can be screwed into a nut member 132.

The extension of the arms 30 may be accomplished by any convenient means. It will be understood that by varying the inclination of the arms 30 carrying the rollers 29 in contact with the walls of the gallery, the machine may be given a different direction during drilling. There are preferably provided four rollers 29 mounted on pivoting arms which may be extensible and which are supported at the four angles of the gallery.

The machine can be brought into position so that it works upwards; in this case, it is provided with pressure rollers and hydraulic supports (not shown) which buttress it and support it in the gallery during the course of excavation.

The machine can readily rotate about itself; it can therefore attack and recut the gallery at all angles, and can be rapidly returned to its starting point.

In a general way, the above description has only been given by way of indication and without any implied limitation, and the invention is capable of a large number of alternative forms in accordance with its spirit.

What is claimed is:

1. In a drilling machine for the excavation of galleries and the like, a rotatably mounted head, a plurality of rotary drilling plates on the head provided on their top face with picks, the axes of said plates being at different distances from the axis of the rotary head, at least one wandering rotary drilling plate having picks thereon, an extensible arm pivoted at one end to said head and carrying at its other end the said wandering plate, means for rotating said plates on the head, means for rotating said wandering plate on an axis therethrough, and means for moving said wandering plate in a non-circular path about the axis of the head.

2. In a drilling machine for the excavation of galleries and the like, means for cutting a circular bore in a mine face comprising rotatably mounted head means carrying face-striking elements thereon, and means for cutting substantially all of the material in the mine face in a non-circular pattern about and contiguous with the material cut by said head means, said last mentioned means comprising a plurality of wandering drilling plates having picks thereon, a plurality of extensible arms each pivoted at one end to said head and each carrying at the other end thereof one of said wandering drilling plates, means for moving each said wandering plate in a closed non-circular path about the axis of said head means, and means for rotating each said wandering drilling plate about its own axis.

3. The drilling machine of claim 2, and further comprising means thereon for removing dislodged material.

4. The drilling machine of claim 3, said last mentioned means comprising a peripheral band having scraper members thereon.

5. The drilling machine of claim 4, and means carried by each wandering plate for assisting in loading said peripheral band.

6. The drilling machine of claim 5, said last mentioned means comprising scrapers.

7. The drilling machine of claim 5, said last mentioned means comprising rotary blades.

8. In a drilling machine for the excavation of galleries and the like, a rotatably mounted head, at least one wandering rotary drilling plate having picks thereon, an extensible arm pivoted at one end to said rotary head and carrying at its other end the said wandering plate, means for rotating said wandering plate on an axis therethrough, rack means in a closed path about the axis of said rotary head, pinion means in mesh with said rack means and carried by the wandering plate, and means for rotating said pinion means to thereby cause said plate to follow the path defined by said rack means.

9. The drilling machine of claim 8 wherein said rack means at at least one part thereof comprises superposed, interrupted and offset racks, said pinion means comprising plural coaxial pinions of different diameters for alternately meshing with said racks.

10. The drilling machine of claim 8 wherein said rack means comprises fixed racks and relatively movable racks, and means for moving said relatively movable racks, whereby to vary the size of said rack means.

11. In a drilling machine for the excavation of galleries and the like, means for drilling a circular hole comprising a rotary head, a plurality of rotary drilling plates on the head, said plates carrying picks thereon, the axes of said plates being at different distances from the axis of the rotary head, means for rotating said plates, and means for removing material in a non-circular pattern about and contiguous with a hole drilled by said plates comprising a plurality of wandering drilling plates having picks thereon, a plurality of extensible arms each pivoted at one end to said rotary head and each carrying at the other end thereof one of said wandering drilling plates, means for moving said wandering plates in a non-circular path extending about the axis of said head contiguous at at least one point to said circular hole comprising template means defining said non-circular path, means on said wandering plates for causing said wandering plates to follow said template means, and means for rotating each wandering drilling plate about its own axis.

12. In a drilling machine for the excavation of galleries and the like, means for drilling a circular hole comprising a rotary head, a plurality of rotary drilling plates on the head, said plates carrying picks thereon, the axes of said plates being at different distances from the axis of the rotary head and the paths of said drilling plates overlapping, means for rotating said plates, and means for removing material in a non-circular pattern about and contiguous with a hole drilled by said plates comprising a plurality of wandering drilling plates having picks thereon, a plurality of extensible arms each pivoted at one end to said rotary head and each carrying at the other end thereof one of said wandering drilling plates, means for rotating each said wandering drilling plate about its own axis, and means for moving said wandering plates about the axis of said head.

References Cited in the file of this patent
UNITED STATES PATENTS

| | | |
|---|---|---|
| 556,985 | Hurd | Mar. 24, 1896 |
| 1,173,158 | Arden | Feb. 29, 1916 |
| 1,353,908 | Hodgson | Sept. 28, 1920 |
| 2,825,544 | Ahlson | Mar. 4, 1958 |